United States Patent
Nistler et al.

(10) Patent No.: US 7,266,813 B2
(45) Date of Patent: Sep. 4, 2007

(54) DETERMINING HOW MANY CLASS-TYPE CHECKS TO INLINE

(75) Inventors: John Gerard Nistler, Rochester, MN (US); Mark Douglas Schroeder, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 10/674,933

(22) Filed: Sep. 30, 2003

(65) Prior Publication Data

US 2005/0071826 A1    Mar. 31, 2005

(51) Int. Cl.
*G06F 9/44* (2006.01)
(52) U.S. Cl. .................. 717/141; 717/130; 717/131
(58) Field of Classification Search ................ 717/106, 717/140–145, 148
See application file for complete search history.

(56) References Cited

U.S. PATENT DOCUMENTS

| | | | | |
|---|---|---|---|---|
| 5,579,518 A * | 11/1996 | Yasumatsu | ................... | 717/131 |
| 5,740,443 A * | 4/1998 | Carini | ................... | 717/133 |
| 6,149,318 A * | 11/2000 | Chase et al. | ................ | 717/131 |
| 6,658,657 B1 * | 12/2003 | Lueh | ................... | 717/158 |
| 6,760,907 B2 * | 7/2004 | Shaylor | ................... | 717/158 |
| 6,848,098 B1 * | 1/2005 | Tsuboi | ................... | 717/151 |
| 6,948,156 B2 * | 9/2005 | Sokolov | ................... | 717/136 |
| 6,964,042 B2 * | 11/2005 | Lagergren | ................... | 717/153 |
| 6,978,448 B1 * | 12/2005 | Plummer et al. | .......... | 717/140 |
| 6,986,130 B1 * | 1/2006 | Boucher | ................... | 717/151 |
| 7,080,354 B2 * | 7/2006 | Adl-Tabatabai et al. | .... | 717/116 |
| 2005/0246699 A1 * | 11/2005 | Lagergren | ................... | 717/153 |

OTHER PUBLICATIONS

Arnold, Matthew, Stephen Fink, Vivek Sarkar and Peter F Sweeney; "A Comparative Study of Static and Profile-Based Heuristics for Inlining";2000; ACM; pp. 52-64.*

* cited by examiner

*Primary Examiner*—Mary Steelman
(74) *Attorney, Agent, or Firm*—Owen J. Gamon (57) ABSTRACT

A method, apparatus, system, and signal-bearing medium that in an embodiment collect profile information about class-type checks, calculate a number of class-type checks that minimizes a cost of inlining, generate inline code for the number of class-type checks for a site in a method, and sort the inline code based on a frequency of the class types. Any remaining class-type checks at the site that are not handled by the inlined class-type checks are handled via an out-of-line function call. In this way, inlined code is used when it provides better performance than an out-of-line function, and the out-of-line function call is used when it provides better performance than the inlined code.

18 Claims, 5 Drawing Sheets

DETERMINING HOW MANY CLASS-TYPE CHECKS TO INLINE

FIELD

This invention generally relates to computer programs and more specifically relates to determining whether to generate inline code for class-type checks.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. Human programmers often write computer programs in a form of computer language that is relatively easy for a human to understand, but which is not efficient for the computer the execute. Another program, such as a compiler or interpreter, then transforms the program into a form that is more efficient for the computer to execute, but relatively difficult for a human to understand.

Recently, Java became a prominent computer language with a wide application spectrum, from embedded systems to enterprise servers. A Java Virtual Machine (JVM) is a software layer that interprets and executes Java bytecodes. One of the major issues in using the Java programming language, or any interpreted language, is performance.

Unfortunately, a standard Java Virtual Machine does not typically yield high-performing programs. In order to increase performance, a technique called just-in-time (JIT) compilation is sometimes used to execute Java code inside the Java Virtual Machine. Through just-in-time compilation, a Java bytecode method is dynamically translated into a native method (code native to the computer on which the program is executing) as the method executes, so as to remove the interpretation overhead of a typical Java Virtual Machine implementation. Since the just-in-time compilation itself is part of the total execution time of a Java program, in order to be useful the compilation must be fast and the benefit from compilation must outweigh the just-in-time compilation overhead. Consequently, the implementation of a Java Virtual Machine with a just-in-time compiler requires many design choices in order to optimize performance of the executing program.

One such design choice involves determining what code to execute inline and what code to execute out-of-line via a method invocation. While it might be tempting to execute all code inline in an attempt to provide maximum performance, such a strategy may lead to a very large amount of generated code, which is often called code bloat. Bloated code has several drawbacks, including consuming more memory in the instruction cache of the processor. Thus, too much inlined code can have a negative impact on performance.

One type of code that is susceptible to code bloat is a feature called runtime class-type checking. Many modern object oriented computer languages, including Java, offer runtime class-type checking, which helps maintain the integrity of programs by ensuring the program is manipulating the correct (expected) classes of objects. (Examples of class-type checking are the use of the "checkcast" and "instance of" Java bytecodes.) But, as is the case with most data integrity/coherency checks, there is a performance cost for doing runtime checking. Thus, anything that can be done to minimize the cost of runtime class-type checking will have a positive impact on the performance of applications.

One way to perform runtime class-type checking is to compare the class of a current object with an expected class type. If they are the same, the check succeeds and execution continues normally. If they are different, the object's entire class hierarchy must be traversed, comparing each of the object's superclasses with the expected class type. Although this solution is simple to implement and generic, it does not perform well if the expected class type is a superclass of an object's class, which is a fairly common occurrence in object-oriented applications. Furthermore, when generating code using a just-in-time compiler, a check implemented like this must be at least partially implemented out-of-line via an external function because traversing a class hierarchy requires more code than can be reasonably inlined at every class-type check site within the program. Unfortunately, any out-of-line function call negatively impacts a program's performance.

Another way to perform runtime class-type checking is to cache some number of the most-recently-encountered object class types and use a hash lookup in order to minimize the access time of the cache. The rationale for this caching is that if an object of a certain class type was just encountered, it is likely that the class type will be encountered again sometime soon. This caching mechanism works well in that it can keep track of both successful and failed class-type checks. One downside to caching is the overhead of updating the cache at runtime. This caching overhead is usually not trivial, so just like the previous solution, the cache checking and updating needs to be done in an out-of-line function, which again negatively impacts performance. Finally, the caching solution could potentially have some problems in a multi-threaded environment, where the cache is constantly being modified by multiple threads.

Without a better way to perform runtime class-type checking, computer users will continue to suffer from poor performance. Although the aforementioned problems have been described in the environment of Java, they can apply to any computer program that needs runtime class-type checking.

SUMMARY

A method, apparatus, system, and signal-bearing medium are provided that in an embodiment collect profile information about class-type checks, calculate the number of class-type checks that minimizes the cost of inlining, generate inline code for the number of class-type checks for a site in a method, and sort the inline code based on a frequency of the class types. Any remaining class-type checks at the site that are not handled by the inlined class-type checks are handled via an out-of-line function call. In this way, inlined code is used when it provides better performance than an out-of-line function, and the out-of-line function call is used when it provides better performance than the inlined code.

DETAILED DESCRIPTION

In an embodiment, profile information is collected at runtime about class-type checks done by an application. Information about the actual type of objects being checked, as well as the number of times a particular object is checked, is kept for each site in the application where a class-type check is performed. When a method containing one or more sites is dynamically compiled by a just-in-time compiler, the profile information about what kind of objects have been type checked is fed into the just-in-time compiler. This profile information allows the just-in-time compiler to determine when to generate inline class-type checking code and when to generate a call to an out-of-line function. The just-in-time compiler also generates code to track the number of times the inlined class-type checks failed, which caused a branch to the external function. If the inlined class-type checks failed often enough, a re-compile is used to collect new profile information.

Figure 1:
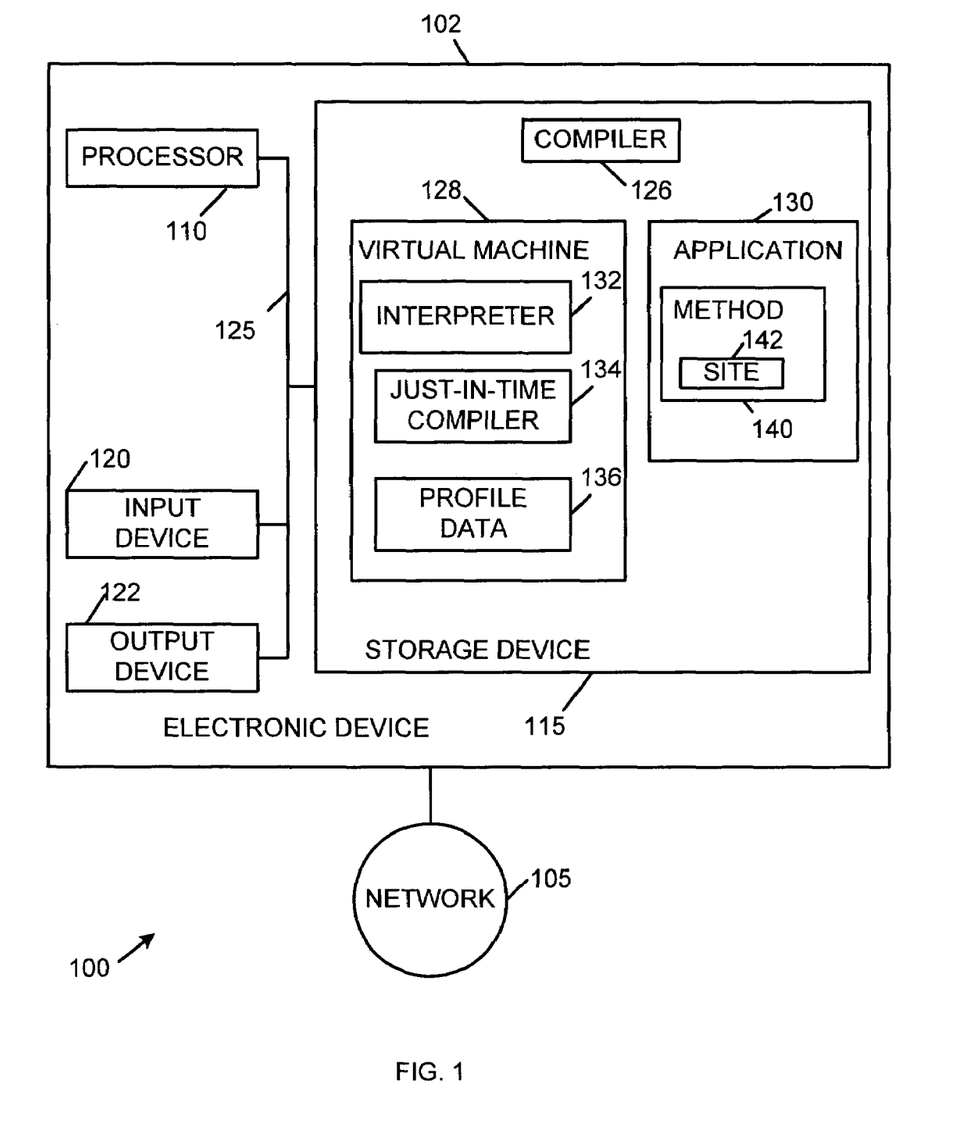
FIG. 1 depicts a block diagram of an example system for implementing an embodiment of the invention.

FIG. 1 depicts a block diagram of an example system 100 for implementing an embodiment of the invention. The system 100 includes an electronic device 102 connected to a network 105. Although only one electronic device 102 and one network 105 are shown, in other embodiments any number or combination of them may be present. In another embodiment the network 105 is not present.

The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 105, the input device 120, and/or the output device 122.

Although the electronic device 102 is shown to contain only a single processor 110 and a single bus 125, embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, hard disk media, floppy disk media, tape media, CD (compact disk) media, DVD (digital video disk) media, optical storage media, flash memory devices, and/or other machine-readable media. In other embodiments, any appropriate type of storage device may be used. Although only one storage device 115 is shown, multiple storage devices and multiple types of storage devices may be present. Further, although the electronic device 102 is drawn to contain the storage device 115, the storage device 115 may be external to the electronic device 102 and/or may be distributed across other electronic devices, such as devices connected to the network 105.

The storage device 115 includes a compiler 126, a virtual machine 128, and an application 130, all of which may in various embodiments have any number of instances. The virtual machine 128 includes an interpreter 132, a just-in-time compiler 134, and profile data 136. The application 130 includes a method 140, which includes a site 142. The application 130 may be any source code, whether written by a user, a third party developer, the designer of the electronic device 102, or of any other origin. The method 140 is an invocable unit within the application 130. The site 142 is a location within the method 140 of at least one class-type check.

The compiler 126 compiles the application 130 into byte codes, which the virtual machine 128 uses as input. In an embodiment, the compiler 126 may be implemented by the javac compiler, but in other embodiments any appropriate compiler that generates instructions that are understood by the virtual machine 128 may be used. In an embodiment, the compiler 126 is a static compiler and does not generate instructions that execute directly on the processor 110.

In an embodiment, the interpreter 132 and the just-in-time compiler 134 include instructions capable of executing on the processor 110 or statements capable of being interpreted by instructions executing on the processor 110 to carry out the functions as further described below with reference to FIG. 3 and FIGS. 4-5, respectively. In another embodiment, the interpreter 132 and/or the just-in-time compiler 134 may be implemented in hardware via logic gates and/or other appropriate hardware techniques.

The interpreter 132 interprets the byte code form of the method 140 and collects the profile data 136. The profile data is further described below with reference to FIG. 2.

The just-in-time compiler 134 is invoked by the interpreter 132 when necessary to compile the bytecode form of a method in the application 130. The just-in-time compiler 134 accesses the profile data 136 in order to decide whether to generate inline code or an out-of-line function call for class-type checks at the site 142 within the method 140. In contrast to the compiler 126, the just-in-time compiler 134 is a dynamic compiler instead of a static compiler; further, the just-in-time compiler 134 generates instructions that execute directly on the processor 110.

Although the compiler 126, the virtual machine 128, and the application 130 are illustrated as being separate entities, in other embodiments some or all of them may be packaged together. Although the compiler 126, the virtual machine 128, and the application 130 are all illustrated as being contained within the storage device 115 in the electronic device 102, in other embodiments some or all of them may be on different electronic devices and may be accessed remotely, e.g., via the network 105.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces (if any) of the electronic device 102. Although only one input device 120 is shown, in another embodiment any number (including zero) and type of input devices may be present.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number (including zero) of output devices of different types or of the same type may be present.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 105 may be any suitable network or combination of networks and may support any appropriate protocol suitable for communication of data and/or code to/from the electronic device 102. In various embodiments, the network 105 may represent a storage device or a combination of storage devices, either connected directly or indirectly to the electronic device 102. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3×specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be a FRS (Family Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102, and that, when read and executed by one or more processors in the electronic device 102, cause the electronic device to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
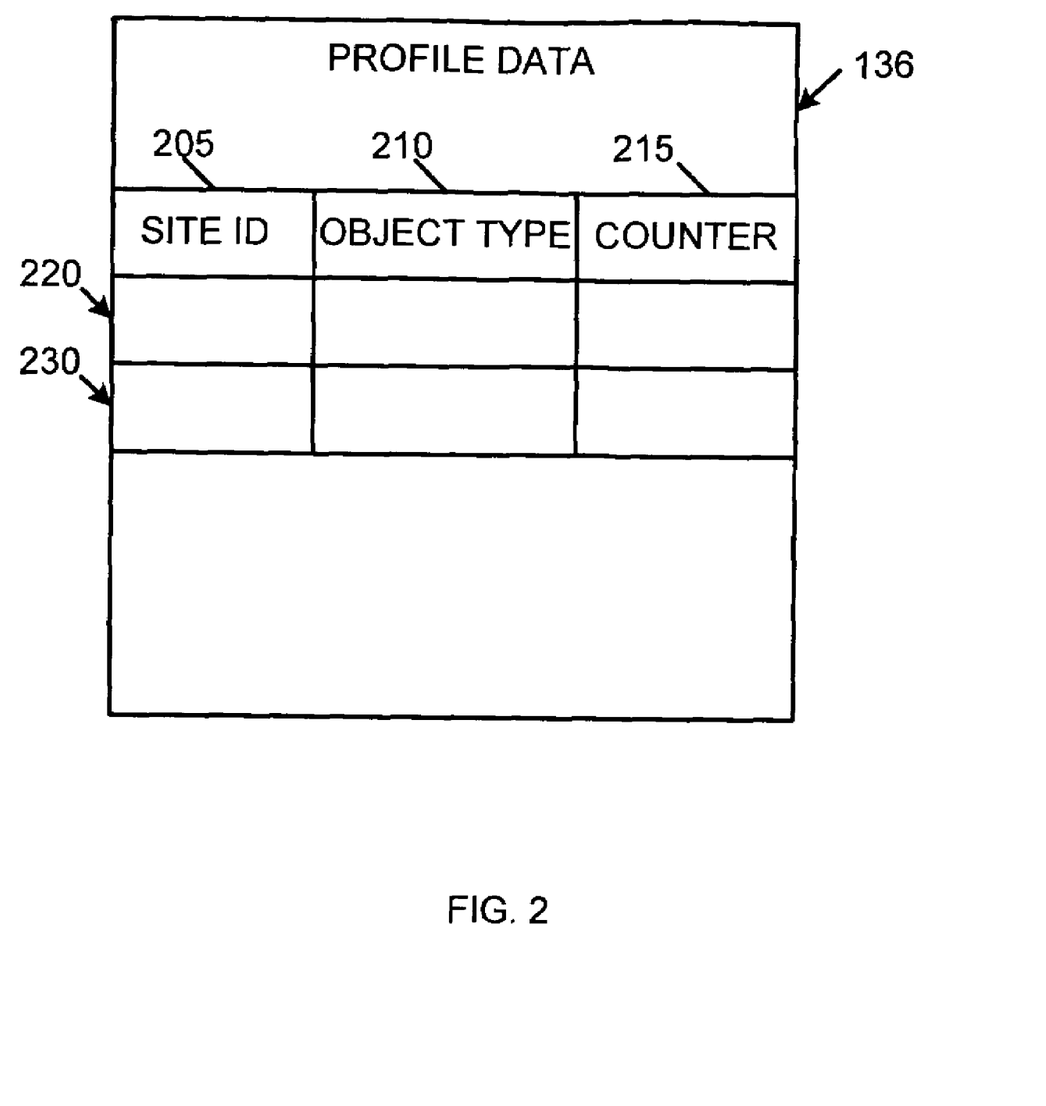
FIG. 2 depicts a block diagram of an example data structure for profile data, according to an embodiment of the invention.

FIG. 2 depicts a block diagram of an example data structure for the profile data 136, according to an embodiment of the invention. The profile data includes entries 220 and 230, but in other embodiments any number of entries may be present. Each entry includes a site identifier field 205, and object type field 210, and a counter field 215, although in other embodiments more or fewer fields may be present.

The site identifier field 205 uniquely identifies the site 142 within the method 140. The object type field 210 indicates the type of object that is having its type checked at the site 142. The counter field 215 indicates the number of times that a given object type has been checked at the site 142.

Figure 3:
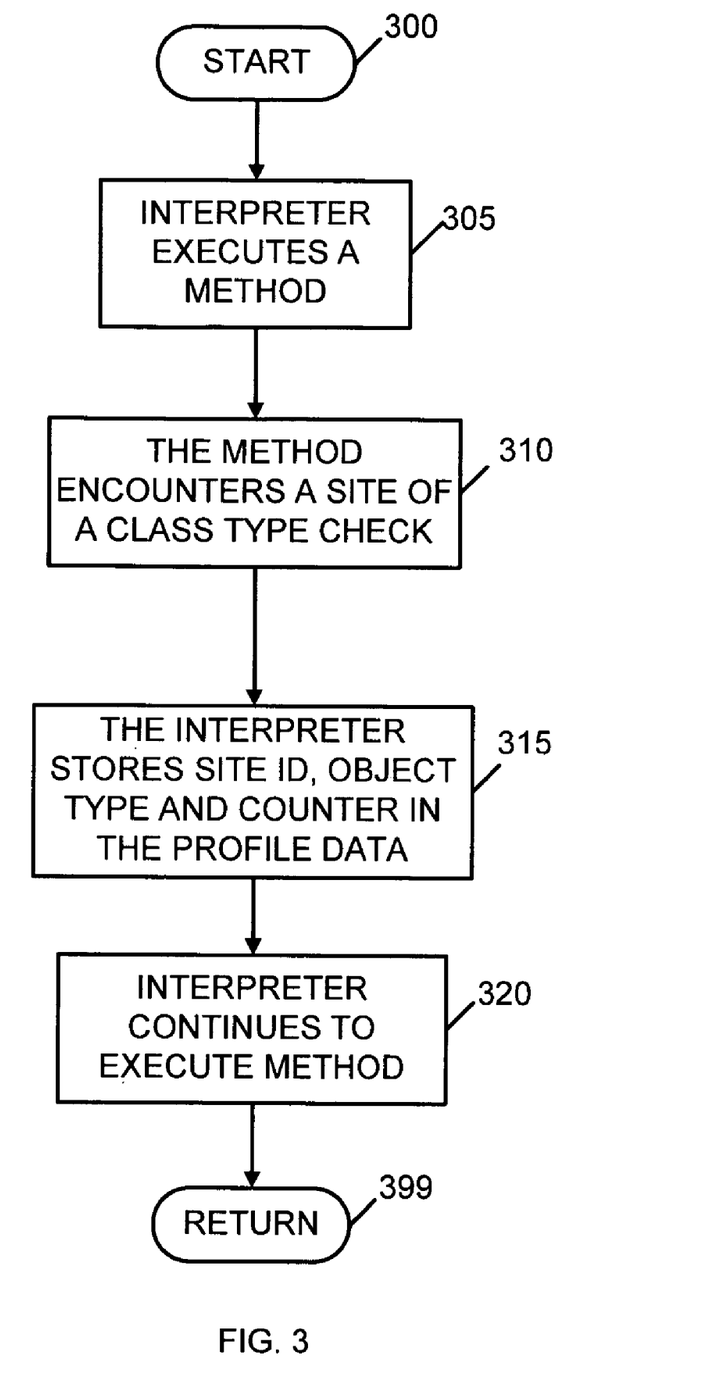
FIG. 3 depicts a flowchart of example processing for an interpreter, according to an embodiment of the invention.

FIG. 3 depicts a flowchart of example processing for the interpreter 132, according to an embodiment of the invention. Control begins at block 300. Control then continues to block 305 where the interpreter 132 executes a method, such as the method 140 (FIG. 1). Control then continues to block 310 where the method 140 encounters a site of a class-type check, such as the site 142. Control then continues to block 315 where the interpreter 132 creates a new entry (e.g., the record 220 or 230) in the profile data 136 associated with the site 142 (if an entry does not already exist) and stores an identifier associated with the site and object type encountered at the site 142 in the site identifier 205 and the object type 210, respectively. If the entry already existed, the interpreter 132 increments the counter 215 in the pre-existing entry. If the entry did not already exist, the interpreter 132 initializes the counter 215 to one. Control then continues to block 320 where the interpreter 132 continues to execute the method. Control then continues to block 399 where the logic of FIG. 3 returns. The logic of FIG. 3 may be performed for every method 140 and every time the method 140 is interpreted.

Figure 4:
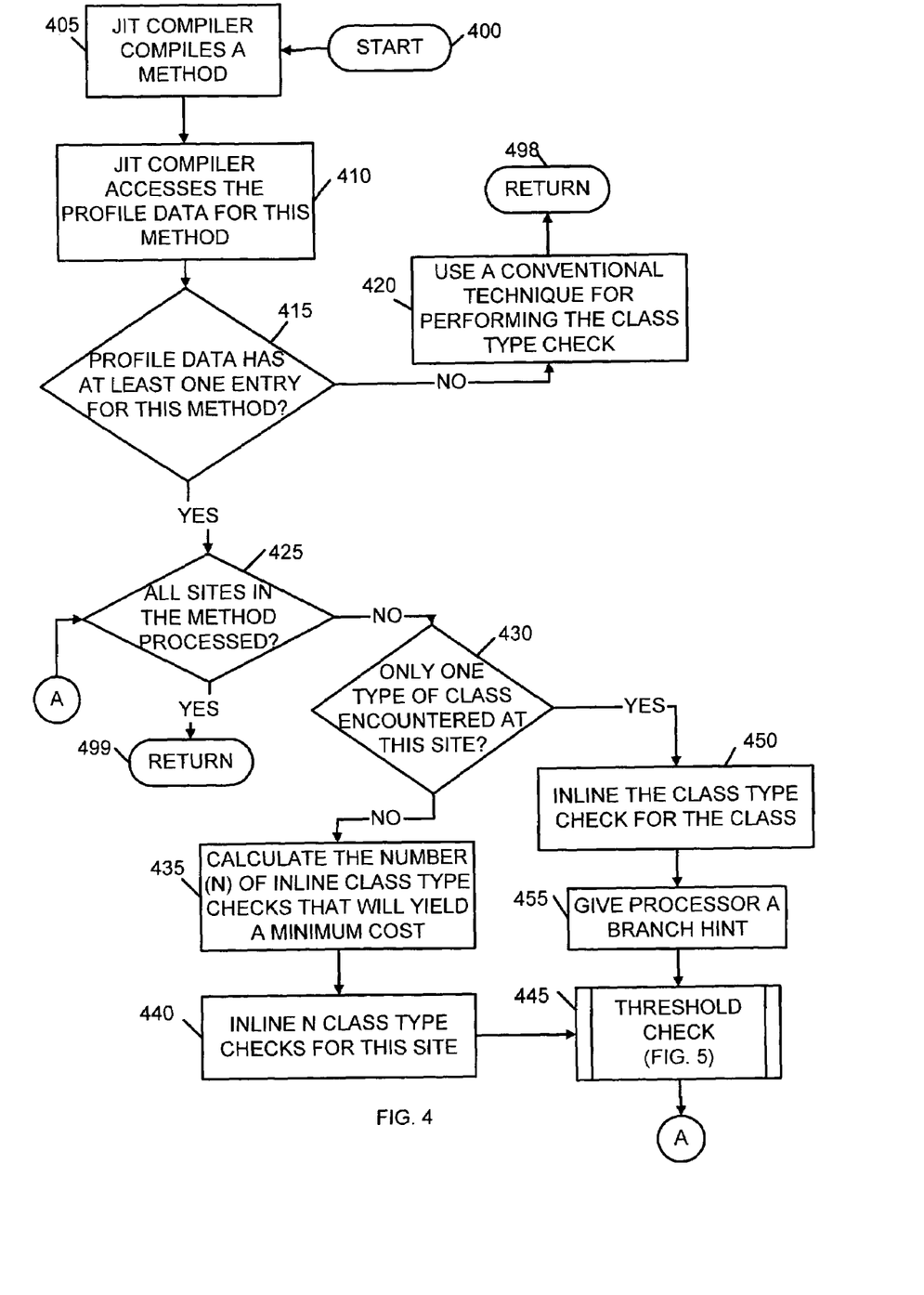
FIG. 4 depicts a flowchart of example processing for a just-in-time compiler, according to an embodiment of the invention.

FIG. 4 depicts a flowchart of example processing for the just-in-time compiler 134, according to an embodiment of the invention. Control begins at block 400. Control then continues to block 405 where the just-in-time compiler 134 begins compilation of the method 140. Control then continues to block 410 where the just-in-time compiler 134 accesses the profile data 136 associated with the method 140. Control then continues to block 415 where the just-in-time compiler 134 determines whether the profile data 136 has at least one entry associated with this method. If the determination at block 415 is false, then control continues to block 420 where the just-in-time compiler 134 uses a conventional technique for performing any class-type checks in the method. Control then continues to block 498 where the function returns.

If the determination at block 415 is true, then control continues to 425 where the just-in-time compiler 134 determines whether all class-type checking sites in the method have been processed. If the determination at block 425 is false, then at least one class-type checking site in the method remains to be processed, so control continues to block 430 where the just-in-time compiler 134 determines whether only one class type is encountered at the class-type checking site. If the determination at block 430 is false, then more than one type of class is encountered at the class-type checking site, so control continues to block 435 where the just-in-time compiler 134 calculates the number (N) of inline class-type checks that will yield a minimum cost of checking the class type at runtime.

In an embodiment, the just-in-time compiler 134 calculates the N (the number of class-type checks to be inlined) that minimizes the cost of the class-type checking using the following formula:

$$\text{Cost} = \left(\left(\sum_{i=1}^{N} C_f + (C_i * i)\right) * H(i)\right) + (T_o * (C_f + C_o + (C_i * N)))/T$$

where:

N (number) is the number of inlined class-type checks at the site 142 in the method;

$C_f$ (fixed cost) is the constant fixed cost required for a class-type check;

$C_i$ (inline cost) is the cost of a single inlined class-type check;

H (hits) is a list (sorted in descending order) of the class type counts collected during profiling;

T (total) is the total number of class-type checks counted during profiling;

$C_o$ (cost of out-of-line) is the cost of performing a class-type check via an out-of-line function call; and $T_o$ (total out-of-line) is the number of times the inlined class-type checks would fail, forcing a call to an out-of-line function. In an embodiment, $T_o$ is computed as:

$$T_o = T - \sum_{i=1}^{N} H(i)$$

In the above equations, the various costs may be expressed using any appropriate metric, as long as a consistent metric is used for all of the cost variables. In various embodiments, metrics for costs are expressed as the number of instructions, the number of CPU cycles, or any other appropriate metric. The first half of the equation (the summation) calculates the cost of performing inlined class-type checks. The second half of the equation (the rest of the equation sans the division by T) calculates the cost of performing the class-type check via an external function call. The sum of these two costs is then divided by T. The result is the average cost of performing a class-type check at the site 142 with N number of inlined checks. The lower the cost, the cheaper the class-type check.

The just-in-time compiler 134 begins by specifying zero for N, which yields a worst case scenario Cost, i.e., the cost of always branching to an external function to perform the class-type check. The just-in-time compiler 134 then iterates (from 0 to N) through the potential number of inlines, determining the cost of adding each inline. The just-in-time compiler 134 then picks the N with the lowest cost.

Control then continues to block 440 where the just-in-time compiler 134 generates inline code for N class-type checks at the current class-type checking site. In an embodiment, the just-in-time compiler 134 sorts the generated inline code in order to check the most frequently occurring class types first. In another embodiment, the just-in-time compiler 134 generates the inline code in any appropriate order. Control then continues to block 445 where the just-in-time compiler 134 generates code to perform a threshold check as further described below with reference to FIG. 5. Control then returns to block 425 as previously described above.

If the determination at block 430 is true, then only one type of class has thus far been type checked at the current site in the method, so control continues to block 450 where the just-in-time compiler 134 generates inline code for the class-type check for the single class type. Control then continues to block 455 where the just-in-time compiler 134 generates code that gives the processor 110 a branch hint based on the class being type checked. A branch hint allows the just-in-time compiler 134 to give the processor 110 a hint regarding whether a conditional branch is likely to be taken and allows the processor to optimize instruction execution for better performance. Control then continues to block 445 where the just-in-time compiler 134 generates code to perform a threshold check, as further described below with reference to FIG. 5. Control then returns to block 425 as previously described above.

If the determination at block 425 is true, then all class-type checking sites in the method have been processed, so control continues to block 499 where the function returns.

Figure 5:
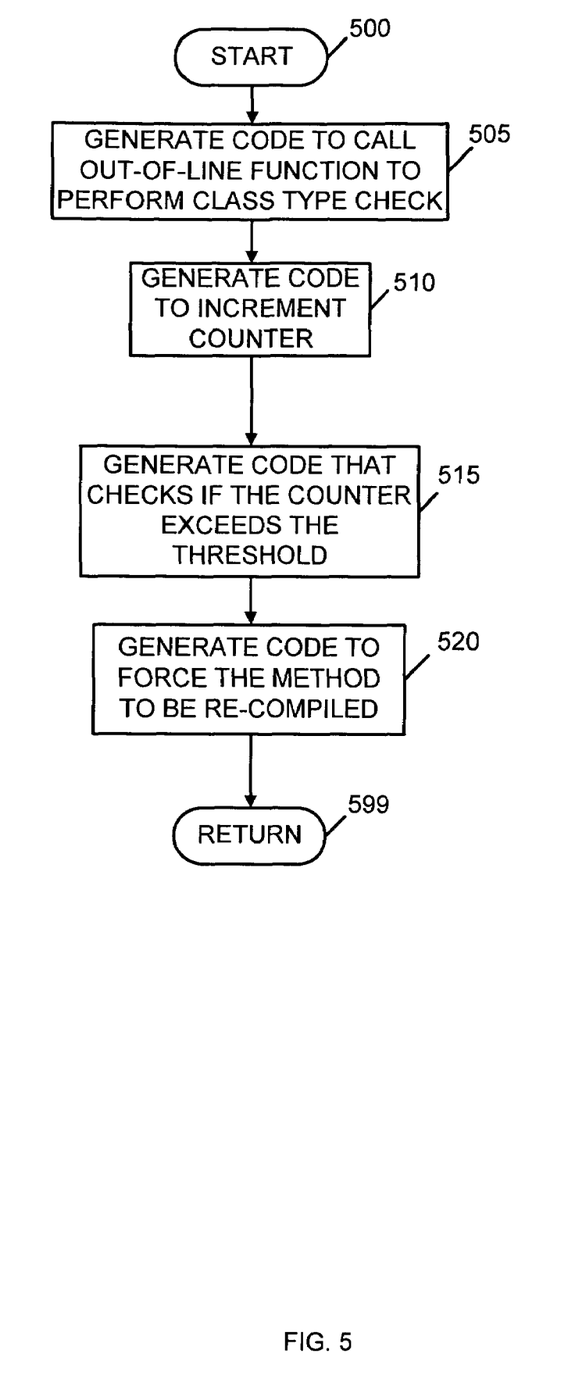
FIG. 5 depicts a flowchart of example processing for the just-in-time compiler, according to an embodiment of the invention.

FIG. 5 depicts a flowchart of example processing for the just-in-time compiler 134, according to an embodiment of the invention. Control begins at block 500. Control then continues to block 505 where the just-in-time compiler 134 generates code to call an out-of-line function to perform a class-type check. In an embodiment, the code to call this function is always generated because even if the profile data suggests that the out-of-line function is not currently needed (i.e., all currently-encountered object types will be handled by the inlined class-type checks), at some later execution point the generated code for the method 140 might encounter a different type of object at the site 142. The out-of line function performs an exhaustive class-type check of the object's entire class hierarchy.

Control then continues to block 510 where the just-in-time compiler 134 generates code to increment a counter that counts the number of times the inlined class-type checks failed, thus forcing a call to the external function.

Control then continues to block 515 where the just-in-time compiler 134 generates code to check if the value for the counter has surpassed a threshold. In an embodiment, the threshold is computed based on the frequency of class-type checks at the site 142. In another embodiment, the threshold is computed using any appropriate function. The just-in-time compiler 134 generates this threshold check to allow for the possibility that the type of objects encountered at the site 142 may change as the application 130 continues to execute. If the inlined class-type checks no longer represent the most-frequently encountered object types at the site 142, the counter will exceed the threshold, causing the method to be re-compiled, so that new profile data can be collected for the method 140.

Control then continues to block 520 where the just-in-time compiler 134 generates code to force the method to be re-compiled. Control then continues to block 599 where the function returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   calculating a number of class-type checks at a site in a method that minimizes a cost of inlining;
   generating inline code for the number of class-type checks for the site in the method;
   sorting the inline code based on a frequency of the class types; and
   generating an out-of-line function call for any remaining class-type checks at the site that exceed the number and that are not handled by the inline code.

2. The method of claim 1, further comprising:
   calculating the number based on a cost of the inline code.

3. The method of claim 1, further comprising:
   calculating the number based on a cost of the out-of-line function.

4. The method of claim 1, further comprising:
   generating a branch hint for a processor if only one class type is encountered at the site.

5. An apparatus comprising:
   means for calculating a number of class-type checks at a site in a method that minimizes a cost of inlining;
   means for generating inline code for the number of the class-type checks for the site in the method;
   means for sorting the inline code based on a frequency of the class types; and
   means for generating an out-of-line function call for any remaining class-type checks at the site that exceed the number and that are not handled by the inline code.

6. The apparatus of claim 5, wherein the means for calculating the number further comprises:
   means for calculating the number based on a cost of the inline code, a cost of an out-of-line class-type check, and a number of times the inline code fails.

7. The apparatus of claim 5, further comprising:
   means for dynamically recompiling the method if a number of the out-of-line function calls exceeds a threshold.

8. A storage medium encoded with instructions, wherein the instructions when executed comprise:
   calculating a number of class-type checks at a site in a method that minimizes a cost of inlining;
   generating inline code for the number of class-type checks for the site in the method;
   sorting the inline code based on a frequency of the class types; and
   generating an out-of-line function call for any remaining class-type checks at the site that exceed the number and that are not handled by the inline code.

9. The storage medium of claim 8, further comprising:
   dynamically recompiling the method if a number of the out-of-line function calls exceeds a threshold.

10. The storage medium of claim 8, wherein the calculating further comprises:
    calculating the number based on a cost of the inline code, a cost of the out-of-line function call, and a number of times the inline code fails.

11. The storage medium of claim 8, wherein the calculating further comprises:
    calculating the number of class-type checks based on a count of object types encountered at the site at runtime.

12. The storage medium of claim 8, further comprising:
    sorting the inline code based on a frequency of the class types, wherein the sorting further sorts the inline code to check a most frequently occurring class type first.

13. An electronic device comprising:
    a processor; and
    a storage device encoded with instructions, wherein the instructions when executed on the processor comprise:
       calculating a number of class-type checks at a site in a method that minimizes a cost of inlining,
       generating inline code for the number of the class-type checks for the site in the method,
       sorting the inline code based on a frequency of the class types, and
       generating an out-of-line function call for any remaining class-type checks at the site that exceed the number and that are not handled by the inline code.

14. The electronic device of claim 13, wherein the calculating further comprises:
    calculating the number based on a cost of the inline code.

15. The electronic device of claim 13, wherein the instructions further comprise:
    dynamically recompiling the method if a number of the out-of-line function calls exceeds a threshold.

16. The electronic device of claim 13, wherein the calculating further comprises:
    calculating the number based on a cost of the out-of-line function call, and a number of times the inline code fails.

17. The electronic device of claim 13, wherein the calculating further comprises:
    calculating the number based on a count of object types encountered at the site at runtime.

18. The electronic device of claim 17, further comprising:
    incrementing the count at runtime.

* * * * *